United States Patent
Staeding et al.

(10) Patent No.: US 10,126,207 B2
(45) Date of Patent: Nov. 13, 2018

(54) MAINTENANCE OF A USED GAS TURBINE

(71) Applicant: MTU Aero Engines AG, Munich (DE)

(72) Inventors: Joern Staeding, Hannover (DE); Jonas Marx, Hannover (DE); Jens Friedrichs, Rothemuehle (DE); Gerald Reitz, Braunschweig (DE)

(73) Assignee: MTU AERO ENGINES AG, Munich (DE)

( * ) Notice: Subject to any disclaimer, the term of this patent is extended or adjusted under 35 U.S.C. 154(b) by 190 days.

(21) Appl. No.: 14/981,002

(22) Filed: Dec. 28, 2015

(65) Prior Publication Data

US 2016/0274000 A1   Sep. 22, 2016

(30) Foreign Application Priority Data

Mar. 17, 2015   (DE) .................. 10 2015 204 797

(51) Int. Cl.
| | |
|---|---|
| *G01M 15/14* | (2006.01) |
| *G05B 23/02* | (2006.01) |
| *F01D 5/00* | (2006.01) |
| *B23P 6/00* | (2006.01) |

(52) U.S. Cl.
CPC ......... *G01M 15/14* (2013.01); *G05B 23/0283* (2013.01); *B23P 6/00* (2013.01); *B23P 6/002* (2013.01); *F01D 5/005* (2013.01); *F05D 2230/72* (2013.01); *F05D 2230/80* (2013.01);
(Continued)

(58) Field of Classification Search
CPC .. B23P 6/002; B23P 6/00; B23P 6/045; F01D 5/005; F01D 21/003; F01D 5/141; F05D 2230/80; F05D 2270/708; F05D 2270/8041; F05D 2270/71; G05B 23/0283; G05B 2219/32226; G05B 2219/32228; G01M 15/14; G06T 2207/30164; G06T 7/0004
See application file for complete search history.

(56) References Cited

U.S. PATENT DOCUMENTS

| | | | | |
|---|---|---|---|---|
| 6,668,272 B1 * | 12/2003 | Keller | ..................... | B23P 6/002 |
| | | | | 709/203 |
| 6,701,615 B2 * | 3/2004 | Harding | .................. | B23P 6/002 |
| | | | | 29/402.07 |
| 7,335,089 B1 | 2/2008 | Thomson | | |

(Continued)

FOREIGN PATENT DOCUMENTS

| | | |
|---|---|---|
| DE | 102007061407 A1 | 7/2008 |
| EP | 1422380 B1 | 7/2009 |
| EP | 2655005 B1 | 10/2014 |

*Primary Examiner* — Manish S Shah
*Assistant Examiner* — Timothy Graves
(74) *Attorney, Agent, or Firm* — Barlow, Josephs & Holmes, Ltd.

(57) ABSTRACT

A method for the maintenance of a used gas turbine includes the at least partially automated steps of: determining the geometry of a flow-guiding component, in particular a rotating blade or a guide vane, of the gas turbine; prognosticating the aerodynamics and/or thermodynamics of the component based on the determined geometry; and classifying the component into one of several predetermined classes based on the prognosticated aerodynamics and/or thermodynamic, where the predetermined classes denote different properties and parameter ranges indicating unusable components to usable components with poor performance.

19 Claims, 1 Drawing Sheet

(52) U.S. Cl.
CPC .............. *G05B 2219/32226* (2013.01); *G05B 2219/45147* (2013.01)

(56) References Cited

U.S. PATENT DOCUMENTS

| | | | |
|---|---|---|---|
| 8,209,839 B1 * | 7/2012 | Brostmeyer | F01D 5/005 29/407.05 |
| 2002/0128790 A1 * | 9/2002 | Woodmansee | B23P 6/002 702/81 |
| 2005/0033555 A1 * | 2/2005 | Tanner | B23P 6/002 702/183 |

* cited by examiner

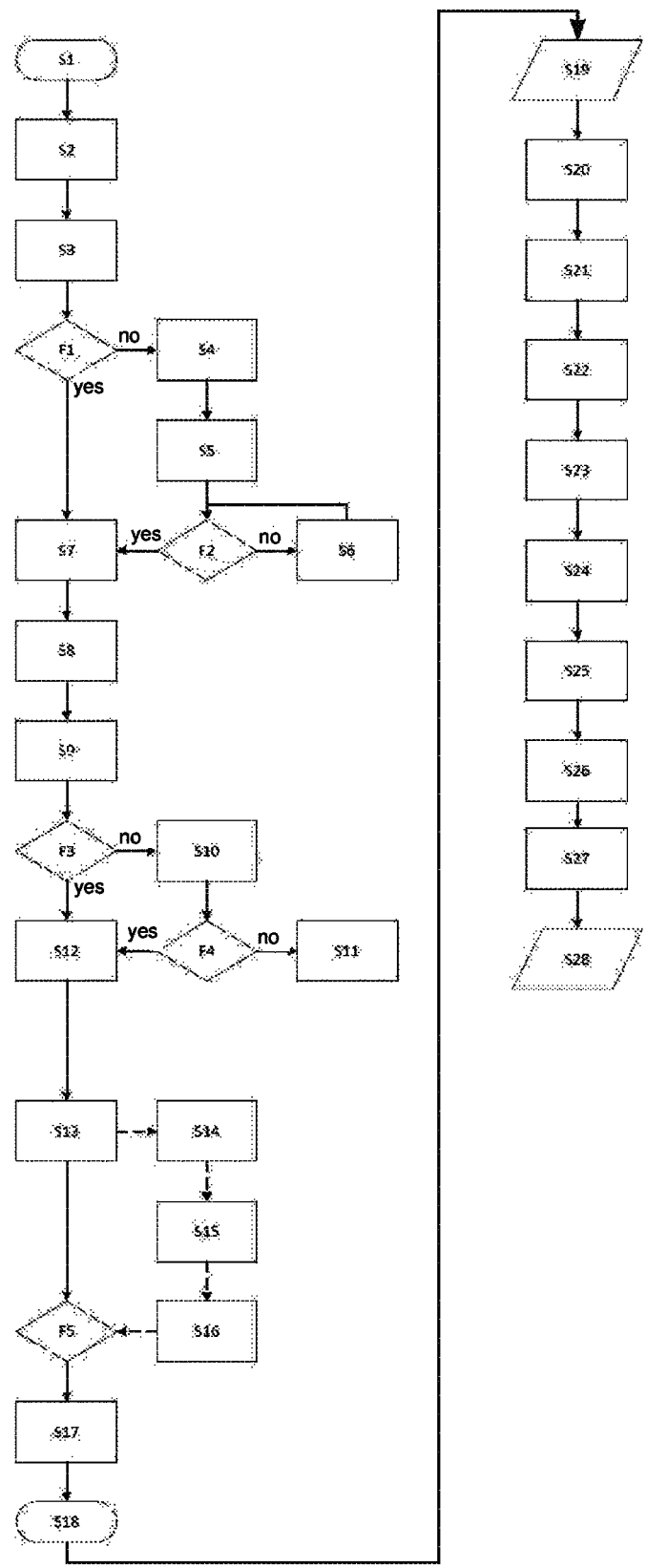

MAINTENANCE OF A USED GAS TURBINE

BACKGROUND OF THE INVENTION

The present invention relates to a method for maintenance of a used gas turbine as well as a system and a computer program product for conducting the method.

A method for repair of gas turbine components is known from EP 2 655 005 B1, in which, first of all, a cyclical process analysis is made of an entire engine containing a like-new component; secondly, a cyclical process analysis is made of the entire engine containing the component after a complete repair; and thirdly, a cyclical process analysis is made of the entire engine containing the component after a partial repair.

SUMMARY OF THE INVENTION

An object of implementing the present invention is to improve the maintenance of used gas turbines.

The object is achieved by a method with the features of the present invention. The present invention sets forth a system or a computer program product for conducting a method described here. Advantageous embodiments of the invention are the subject of the dependent claims.

According to one aspect of the present invention, a method for maintenance, in particular for repair, of a used gas turbine, particularly an aircraft engine gas turbine, comprises the partially or completely automated steps of:
  determining the geometry of a flow-guiding component, in particular a rotating blade or a guide vane, of the gas turbine;
  prognosticating the aerodynamics and/or thermodynamics of the component based on the determined geometry; and
  classifying the component into one of several predetermined classes, particularly predetermined quality classes, based on the prognosticated aerodynamics and/or thermodynamics.

In one embodiment, at least two, particularly at least three, and/or at most ten, particularly at most six, classes, in particular different quality classes, are predetermined, wherein, in one embodiment, different classes, in particular different quality classes, denote different properties, particularly parameter ranges; in particular, in an enhancement, the poorest quality class denotes a component that cannot be used, especially due to aerodynamics and/or thermodynamics; in another enhancement, the poorest quality class denotes a still usable component with poor performance, especially (also) due to aerodynamics and/or thermodynamics, in which components that are no longer usable are rejected.

In one embodiment, the geometry comprises a set of parameters that describes the geometry of the component, in particular aerodynamically and/or thermodynamically and/or structurally relevant parameters, and/or mounting parameters. In one embodiment, the prognosis of the aerodynamics and/or thermodynamics is produced numerically, wherein in one embodiment, a plurality of characteristic curves, for example, polar curves of blade or vane profiles, replacement or exchange rates between variations of independent geometric parameters, and aerodynamic and/or thermodynamic performance behavior.

By means of classifying the component into one of several predetermined classes, especially predetermined quality classes, based on the prognosticated aerodynamics and/or thermodynamics, advantageously, a recommendation can be generated for the further handling of this component.

In particular, a repair recommendation can be advantageously generated for the component. For this purpose, in particular, in one embodiment, the method additionally has the partially or completely automated steps of:
  virtual variation of the geometry of the component;
  prognosticating the aerodynamics and/or thermodynamics of the modified component based on this varied geometry; and
  classifying the modified component into one of the predetermined classes, especially quality classes.

By classifying the modified component into one of the predetermined classes, especially one of the predetermined quality classes, the effect of a repair that leads to the varied geometry can be advantageously evaluated; in particular, it can be further processed in an at least partially automated way.

For this purpose, in one embodiment, a repair recommendation for the component will be output in a completely or partially automated manner, based on the varied geometry, if the class, in particular the quality class, of the modified component fulfills a predetermined condition; in particular, it is better than the class, particularly the quality class, of the component with the determined geometry and/or at least one predetermined minimum or target (quality) class.

In this way, a repair recommendation can be generated or output simply, effectively, and, in particular, in an at least partially automated manner, if it is prognosticated that the repair will lead to a jump in class, particularly in quality class. Additionally or alternatively, the comparison with a predetermined minimum or target (quality) class permits a simple, effective, and, in particular, at least partially automated generation or output of a repair recommendation.

In an enhancement, the geometry of the component will be varied virtually many times in different ways; in particular, different geometric features, particularly those that are independent with respect to a repair, for example, the leading edge geometry, chord length, blade or vane length, blade or vane height, or the like, in each case, can be varied once or many times or can be given different values, individually and/or in several combinations. Then, in each case, the aerodynamics and/or thermodynamics of the component modified in this way is prognosticated based on the thus varied geometry, and the component modified in this way is classified into one of the predetermined classes, in particular, one of the predetermined quality classes. Subsequently, a (partial) repair recommendation based on classes, particularly on quality classes, of the differently varied geometries can be generated or output, especially dependent on the expenditure associated with the respective variation or the repair producing it. In this way, those repair recommendations that lead to a desired class with minimal or minimum expenditure, particularly to a desired quality class, or a jump in class, especially a jump in quality class, can be effectively generated or output.

For example, a chord length and a blade or vane height can be varied independently, and the aerodynamics and/or thermodynamics for each case can be prognosticated. For example, a variation in the chord length can lead to an improvement in the class, particularly the quality class, which is classified based on the aerodynamics and/or thermodynamics prognosticated therefor, whereas a variation in the blade or vane height leads to the same class, in particular, the same quality class. Therefore, a corresponding change in the chord length can be output as a repair recommendation, whereas the blade or vane height need not be changed, so that the repair expenditure can be reduced.

Additionally or alternatively to a generation or output of a repair recommendation for an individual component, in one embodiment, a construction recommendation can also be generated or output for a subassembly or a module having several components. For this purpose, in particular, in one embodiment, the method has the partially or completely automated step of:

prognosticating a property, in particular a quality, of a subassembly containing the component based on its class, in particular, its quality class.

Prognosticating a property, in particular a quality, of a subassembly based on the class, in particular the quality class, of the component, permits a simple, effective, and, in particular, at least partially automated prognosis, since the property, in particular the quality, can no longer be prognosticated based on the concrete, detailed geometry of the respective component, but instead can be prognosticated with a reference component of the corresponding class, in particular the corresponding quality class, whose geometry and/or aerodynamics and/or thermodynamics, in one embodiment, has (have) been determined, in particular averaged, in particular prognosticated or tested, from the geometries or aerodynamics and/or thermodynamics of several different components of this class, in particular of this quality class.

In one embodiment, this permits a simple, effective, and, in particular, at least partially automated, particularly combinatorial, optimization of the subassembly. For this purpose, in particular, in one embodiment, partially or completely automated properties, in particular qualities, of the subassembly are prognosticated on the basis of different arrangements of one or more components of the subassembly, especially based on the class, particularly the quality class, of this or these component(s).

For example, if a (modified) component, for example, a rotating blade, is classified into a specific class, in particular, a specific quality class, in each case, the property, in particular the quality, of the subassembly, for example, of a rotor assembly, of a stage, of a compressor, or of a turbine, or of the entire gas turbine, can be prognosticated on the basis of the reference component of this class, in particular, this quality class, if the latter is or will be disposed alternatively at one of several different positions, for example on a rotor.

Additionally or alternatively to a variation in the arrangements of one or more components of the subassembly, the property, in particular, the quality, of the subassembly can also be prognosticated, if alternative components of the same type, but of different classes, in particular, quality classes, will be disposed on at least one position. In particular, for this purpose, in one embodiment, properties, in particular qualities, of the subassembly are prognosticated in a partially or completely automated manner, based on different classes, in particular different quality classes, of one or more components of the subassembly, wherein, in one embodiment, alternatively, reference components of the different classes, in particular of the different quality classes, are provided at the same position, and the property, in particular the quality, of the subassembly is prognosticated in each case with the reference component disposed in this way.

If, for example, a subassembly, for example, a rotor assembly, a stage, a compressor, or a turbine, or the entire gas turbine, has a specific component, for example, a rotating blade, at one position, in each case, the property, in particular the quality, of the subassembly can be prognosticated on the basis of reference components of different classes, in particular different quality classes, if these are or will be disposed alternatively at this position. Additionally or alternatively, in each case, the property, in particular the quality, of the subassembly can be prognosticated on the basis of a reference component of a class, in particular a quality class in which a component has been classified on the basis of its determined or varied geometry, and the prognosticated aerodynamics and/or thermodynamics therefor, if this reference component is or will be disposed alternatively at different positions.

In an enhancement, the different classes, in particular the different quality classes, or reference components are predetermined in a partially or completely automated way on the basis of a current inventory.

If, for example, a dismantled component has a first class, in particular a first quality class, the modified component, i.e., after a corresponding repair, has a prognosticated better second class, in particular a better second quality class, and a replacement component alternatively present in current inventory has a better third class, in particular a better third quality class, then the property, in particular the quality, of the subassembly, can be prognosticated in each case with a reference component of the first, second and third class, in particular the first, second and third quality class, and thus it can be determined simply, effectively and in particular, in an at least partially automated way, whether the dismantled component should be installed without repair, or whether the repaired component or the replacement component from current inventory should be installed at the corresponding position.

Correspondingly, in one embodiment, a construction recommendation for the subassembly is output or generated in a completely or partially automated way on the basis of one of the prognosticated properties, in particular, qualities, and/or a stock, in particular a current inventory.

As explained above, the prognosis of the property, in particular the quality, of the subassembly, can be determined on the basis of reference components that are representative for the respective class, in particular the quality class, in particular on the basis of an averaging of different geometries and/or aerodynamics and/or thermodynamics within the class, in particular the quality class, in one embodiment, advantageously permitting an optimization of the subassembly, in particular a combinatorial optimization of the subassembly, without needing to simulate this optimization with concrete components each time.

In one embodiment, the geometry is determined robotically and/or optically, in particular by means of photogrammetric stripe light projection, in particular by robot-guided moving of the component and/or a device for photogrammetric stripe light projection. In one embodiment, the photogrammetric stripe light projection generates a three-dimensional scatter plot.

In one embodiment, the geometry of the component comprises or describes a blade-element or vane-element geometry, in particular a leading-edge and/or a trailing-edge geometry, chord length, chord length or blade or vane height, and/or a blade-root or vane-root geometry, in particular an orientation of the blade or vane root for the blade or vane element.

In one embodiment, the component is pre-examined in a completely or partially automated way, in particular, for its weight and/or (surface) damage, and its geometry is determined dependent on whether the component fulfills a predetermined condition of pre-examination. In an enhancement, the steps described here for the classification of the (modified) component are only conducted or first conducted if the component fulfills the predetermined condition of pre-examination, optionally after corresponding repair, for example, which has already occurred due to the (surface) damage, for example, it has an appropriate weight and/or a corresponding surface. Otherwise, i.e., if the component (still) does not fulfill the condition of pre-examination, in one embodiment, the component can be introduced to repair or rejected or discarded, in particular, in a completely or partially automated way.

In one embodiment, the aerodynamics and/or thermodynamics are prognosticated in a completely or partially automated way on the basis of a one-dimensional or multidimensional deviation of the geometry from one or more predetermined geometries, in particular, by interpolation based on a database of predefined geometries and aerodynamics and/or thermodynamics assigned to these.

Thus, in one embodiment, specific aerodynamics and/or thermodynamics can be predetermined or stored in a database, for example, for different chord lengths and different blade or vane heights. The determined chord length and blade or vane height of a component will then be compared with these stored chord lengths and blade or vane heights and their aerodynamics and/or thermodynamics will be interpolated correspondingly (multidimensionally), whereby in the present case, for more compact presentation, an extrapolation is also understood in general terms as an interpolation in the sense of the present invention.

In one embodiment, aerodynamics indicates one-dimensionally or multidimensionally an aerodynamic performance of the component, for example a flow resistance, a pressure difference, an (aerodynamic) efficiency, a deflection angle, an (aerodynamic) loss coefficient and/or an (aerodynamic) characteristic curve.

In one embodiment, thermodynamics indicates one-dimensionally or multidimensionally a thermodynamic performance of the component, for example, a heat absorption and/or heat release, a temperature difference, a (thermodynamic) efficiency, and/or a (thermodynamic) characteristic curve.

In one embodiment, the component is classified not only on the basis of its prognosticated aerodynamics and/or thermodynamics, but also additionally on the basis of one or more further attributes, in particular a resistance to aging relative to application-specific wear.

In one embodiment, the classification based on several criteria can be additive, wherein a better value for one criterion can compensate for a poorer value of another criterion, and thus can bring about a classification into a better class, in particular, a better quality class. Likewise, in one embodiment, the classification based on several criteria can be cumulative, wherein all criteria must have a specific minimum value each time for a classification into a corresponding class, in particular, into a corresponding quality class.

In one embodiment, an identification is assigned to the component in a completely or partially automated way, and this is linked, in particular stored, particularly in a database, with data determined for the component, in particular its determined geometry and/or class, particularly its quality class and/or its history, in particular its repair history and/or geometric history.

In an enhancement, the identification will be generated dependent on need: for this purpose, in one embodiment, it will first be examined, in particular optoelectronically, whether the component already has a corresponding identification. If this is not the case, an identification will be produced for the component, i.e., it will be generated dependent on need, for example, by producing an optoelectronically readable coding at a predetermined site of the component, particularly a site allowed by aviation technology.

According to one aspect of the present invention, a system for conducting a method described here is furnished with and/or has:

means for determining the geometry of a flow-guiding component of the gas turbine;

means for prognosticating the aerodynamics and/or thermodynamics of the component based on the determined geometry; and means for classifying the component into one of several predetermined classes, particularly predetermined quality classes, based on the prognosticated aerodynamics and/or thermodynamics.

In one embodiment, the system has:

means for the virtual variation of the geometry of the component;

means for prognosticating the aerodynamics and/or thermodynamics of the modified component based on this varied geometry; and means for classifying the modified component into one of the classes, particularly into one of the quality classes.

In one embodiment, the system has means for the output of a repair recommendation of the component based on the varied geometry, if the class, particularly the quality class, of the modified component fulfills a predetermined condition, in particular, if it is better than the class, particularly the quality class, of the component with the determined geometry.

In one embodiment, the system has means for prognosticating a property, in particular a quality, of a subassembly containing the component, based on its class, particularly its quality class.

In one embodiment, the system has means for prognosticating properties, in particular qualities, of the subassembly, based on different arrangements, and/or on predetermined, different classes, particularly predetermined, different quality classes, of at least one component of the subassembly, in particular based on a current inventory.

In one embodiment, the system has means for the output of a construction recommendation for the subassembly, based on one of the prognosticated properties, particularly one of the prognosticated qualities.

In one embodiment, the system has a robot and/or a means for recording the geometry, in particular, a device for photogrammetric stripe light projection.

In one embodiment, the system has means for pre-examining the component.

In one embodiment, the system has means for prognosticating the aerodynamics and/or thermodynamics based on a deviation of the geometry from at least one predetermined geometry, in particular, by interpolation based on a database of predetermined geometries and aerodynamics and/or thermodynamics assigned to these.

In one embodiment, the system has means for classifying the component additionally on the basis of at least one further attribute, in particular, a resistance to aging relative to application-specific wear.

In one embodiment, the system has means for assigning an identification to the component, in particular an identification that is generated dependent on need, and for linking this identification with data determined for the component, in particular its determined geometry and/or class, in particular its quality class, and/or its history.

BRIEF DESCRIPTION OF THE DRAWING FIGURE

Additional advantageous enhancements of the present invention can be taken from the claims and the following description of preferred embodiments. For this purpose and partially schematized, the single FIGURE shows:

FIG. 1—a flow chart showing the method according to an embodiment of the present invention.

DETAILED DESCRIPTION OF THE INVENTION

FIG. 1 shows a method according to an embodiment of the present invention.

In a step S1, components in the form of gas turbine blades or vanes are supplied in a small-load carrier. In a step S2, an RFID chip or barcode or another identification of the small-load carrier is read out, on which, in the form of a digital job ticket, different information relating to the component was noted during the dismantling (for example, engine type, stage, type of finding: "main findings" or "final check", blade or vane (element) type).

In a step S3, the components in the small-load carrier are isolated by means of an industrial robot and optically investigated for a predetermined identification in the form of a data matrix code. If this identification (marking) is present (F1: "yes"), the component specified for the final check is weighed at the next station (step S7). The result is transferred to a component database by means of the previously read-out identification. Components for the main findings skip over this step and are prepared in a step S8 for the visual inspection.

If the data matrix code is not present (F1: "no"), a recording of the part number and serial number of the component is made by optical imaging sensors (step S4). Connected with this, an identification is generated and introduced on the component (step S5). In order to ensure readability of the code in the downstream operating steps, a check of the data matrix code is made with respect to readability in step F2. If the labeling is not machine-readable (F2: "no"), the code is post-processed in step S6; otherwise, specific components for the final check are weighed in step S7.

After weighing the components specified for the final check (step S7), the components for both types of finding are cleaned by means of demineralized water (step S8) for the visual inspection and examined by means of an optical method with respect to their surface damage (step S9), i.e., a pre-examination is conducted. If the damage is within a predetermined limit (F3: "yes"), the preparation for the stripe light projection follows via powder coating (step S12). Otherwise, the components are manually post-examined (step S10) and either introduced to further measurement (step S12), if manual examination yields the result that the damage is still within the predetermined limit (F4: "yes"); otherwise (F4: "no"), the component is rejected in step S11.

After a matting or dulling of the components in preparation for the stripe light projection in step S12, the recording of a three-dimensional scatter plot, i.e., a determination of geometry follows in step S13.

In a step S14, in each case, aerodynamics and/or thermodynamics are prognosticated for engine components with the note "main findings", based on the determined geometry as well as on a geometry varied in each case by one or more parameter values or multidimensionally; and in a step S15, the (modified) components are classified into one of 3 to 5 predetermined classes, in particular predetermined quality classes.

In the case of components with the finding type "final check", only the aerodynamics and/or thermodynamics are prognosticated on the basis of the determined geometry in step S14, and the component is classified into one of the classes, in particular one of the quality classes, in a step S15.

In step S16, the measurement results and classes, in particular quality classes, are stored in the component database.

The assignment of a findings code is made in step S17 on the basis of the results calculated in steps S14, S15, and the appropriate further directing of the components is made in step S18.

If, in this case, the classification of modified components made in steps S14, S15 results in the fact that a specific variation of one or more geometric parameters brings about a jump in a (quality) class into a predetermined minimum (quality) class, then, a corresponding repair recommendation which determines this variation of the geometry parameter(s) for the component is output in step S17. The corresponding component is then discharged in step S18 for the repair, and after the repair has been produced, it is again introduced into step S1 or S7, for example.

Downstream to these steps, the generation of a construction recommendation results. For this purpose, according to one embodiment of the present invention, a multi-criteria target specification results for the system via the method described here (step S19).

This target specification can be compiled, for example, from a specific fuel consumption that is as small as possible for an exhaust gas temperature that is as low as possible, and with minimal repair costs. The knowledge of current inventory, which is determined via a query (step S20) is also advantageous for creating the construction recommendation. The subassembly to be optimized is loaded with components virtually for an iterative performance simulation (step S21), corresponding to the inventory. This first selection is reserved for further query (step S22) and the geometric data of the components are queried (step S23). A performance calculation is produced with these geometric data using an iteratively controllable calculation model (step S24). With the assistance of an algorithm of the combinatory optimization (step S25), the selection is made of a set of components (step S26) that achieves the above-defined target objectives. This set of components is set aside for the project and correspondingly made ready in the stockroom (step S27) before the user is informed of the calculation results in step S28.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A method for the maintenance of a used gas turbine comprising the at least partially automated steps of:
   determining the geometry of a flow-guiding component, configured as rotating blade or a guide vane, of the gas turbine;
   prognosticating the aerodynamics and/or thermodynamics of the component based on the determined geometry;
   classifying the component into one of several predetermined classes based on the prognosticated aerodynamics and/or thermodynamics, said predetermined classes denoting different properties and parameter ranges indicating unusable components to usable components with poor performance;
   virtual variation of the geometry of the component;
   prognosticating the aerodynamics and/or thermodynamics of the component based on this varied geometry;
   classifying the component into one of the classes; and
   repairing the component based upon a repair recommendation for the component which is output, in an at least partially automated way, on the basis of the varied geometry, if the class of the component fulfills a predetermined condition, wherein the component has prognosticated aerodynamics and/or thermodynamics increased over the class of the component with the determined geometry.

2. The method according to claim 1, further comprising the at least partially automated step of:
   prognosticating a property of a subassembly containing the component, based on the class of the component.

3. The method according to claim 2, wherein properties of the subassembly will be prognosticated, in an at least partially automated way, based on different arrangements and/or on different classes with classes predetermined on the basis of a current inventory, for at least one component of the subassembly.

4. The method according to claim 1, wherein a construction recommendation for the subassembly will be output, in an at least partially automated way, on the basis of one of the prognosticated aerodynamics and/or thermodynamics of the component.

5. The method according to claim 1, wherein the geometry will be determined robotically and/or with a means for recording geometry by optical recording and by means of photogrammetric stripe light projection, and/or comprises the geometry of a blade or vane element and/or a blade or vane root.

6. The method according to claim 1, wherein the component is pre-examined, in an at least partially automated way, and its geometry is determined dependent on whether the component fulfills a predetermined condition of pre-examination.

7. The method according to claim 1, wherein the aerodynamics and/or thermodynamics will be prognosticated, in an at least partially automated way, on the basis of a deviation in the geometry of at least one predetermined geometry by interpolation based on a database of predetermined geometries and aerodynamics and/or thermodynamics assigned to these.

8. The method according to claim 1, wherein the component is additionally classified on the basis of at least one further attribute as a resistance to aging relative to application-specific wear.

9. The method according to claim 1, wherein an identification is assigned to the component in an at least partially automated way with an identification generated dependent on need, and this is linked with data determined for the component, configured as the averaged geometry and/or the class and/or the history of the component.

10. The method according to claim 1, further comprising:
    a system for conducting the method.

11. A method for the maintenance of a used gas turbine comprising the at least partially automated steps of:
    determining the geometry of a flow-guiding component, configured as rotating blade or a guide vane, of the gas turbine;
    prognosticating the aerodynamics and/or thermodynamics of the component based on the determined geometry;
    classifying the component into one of several predetermined classes based on the prognosticated aerodynamics and/or thermodynamics, said predetermined classes denoting different properties and parameter ranges indicating unusable components to usable components with poor performance;
    prognosticating a property of a subassembly containing the component, based on the class of the component, in at least a partially automated way; and
    constructing the subassembly based upon a construction recommendation for the subassembly, wherein the construction recommendation is output, in an at least partially automated way, on the basis of one of the prognosticated aerodynamics and/or thermodynamics of the component,
    wherein properties of the subassembly are prognosticated, in an at least partially automated way, based on different arrangements and/or on different classes with classes predetermined on the basis of a current inventory, for at least one component of the subassembly.

12. The method according to claim 11, comprising the at least partially automated steps of:
    virtual variation of the geometry of the component;
    prognosticating the aerodynamics and/or thermodynamics of the component based on this varied geometry; and
    classifying the component into one of the classes.

13. The method according to claim 12, wherein a repair recommendation for the component will be output, in an at least partially automated way, on the basis of the varied geometry, if the class of the component fulfills a predetermined condition, wherein the component has prognosticated aerodynamics and/or thermodynamics increased over the class of the component with the determined geometry.

14. The method according to claim 11, wherein the geometry will be determined robotically and/or with a means for recording geometry by optical recording and by means of photogrammetric stripe light projection, and/or comprises the geometry of a blade or vane element and/or a blade or vane root.

15. The method according to claim 11, wherein the component is pre-examined, in an at least partially automated way, and the geometry of the component is determined dependent on whether the component fulfills a predetermined condition of pre-examination.

16. The method according to claim 11, wherein the aerodynamics and/or thermodynamics will be prognosticated, in an at least partially automated way, on the basis of a deviation in the geometry of at least one predetermined geometry by interpolation based on a database of predetermined geometries and aerodynamics and/or thermodynamics assigned to these.

17. The method according to claim 11, wherein the component is additionally classified on the basis of at least one further attribute as a resistance to aging relative to application-specific wear.

18. The method according to claim 11, wherein an identification is assigned to the component in an at least partially automated way with an identification generated dependent on need, and this is linked with data determined for the component, configured as the averaged geometry and/or the class and/or the history of the component.

19. The method according to claim 11, further comprising:
   a system for conducting the method.

\* \* \* \* \*